United States Patent [19]
Leslie

[11] 3,907,446
[45] Sept. 23, 1975

[54] SHANK AND SOCKET JOINT AND METHOD OF MAKING SAME

[75] Inventor: Gurdon Leslie, North Madison, Ohio

[73] Assignee: True Temper Corporation, Cleveland, Ohio

[22] Filed: May 4, 1972

[21] Appl. No.: 250,341

[52] U.S. Cl................................ 403/268; 285/22
[51] Int. Cl............................................ F16l 13/10
[58] Field of Search ............... 287/20.2 R, 20.92 E; 85/63; 52/297; 285/DIG. 16, 22; 264/262, 261; 238/371; 403/265–268; 156/294

[56] References Cited
UNITED STATES PATENTS

| | | | |
|---|---|---|---|
| 260,961 | 7/1882 | Flickinger | 52/297 |
| 808,401 | 12/1905 | Percival | 85/63 X |
| 1,318,584 | 10/1919 | Pierce | 85/82 |
| 2,876,154 | 3/1959 | Usab | 156/294 |
| 3,107,053 | 10/1963 | Deenik et al. | 238/371 X |
| 3,716,608 | 2/1973 | Neumann | 264/262 |

FOREIGN PATENTS OR APPLICATIONS

| | | | |
|---|---|---|---|
| 205,686 | 1/1957 | Australia | 285/22 |

*Primary Examiner*—Andrew V. Kundrat

[57] ABSTRACT

There is disclosed herein a shank and socket joint wherein a mating socket cavity is oversize to provide clearance around the shank. A particle filled, thixotropic adhesive is disposed within the clearance, the particles being disposed at random intervals around the shank and being of such size as to center the shank within the socket.

6 Claims, 6 Drawing Figures

US Patent  Sept. 23,1975  3,907,446
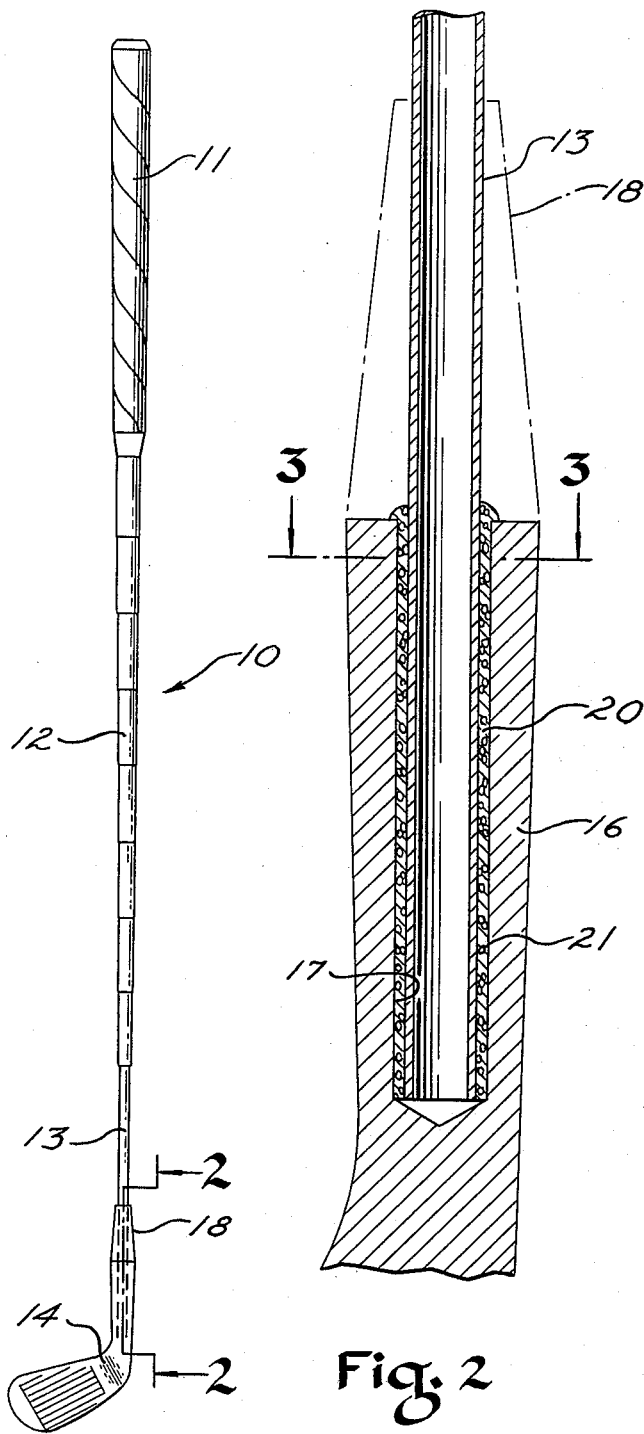
Fig. 1
Fig. 2
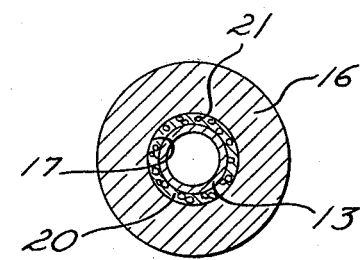
Fig. 3
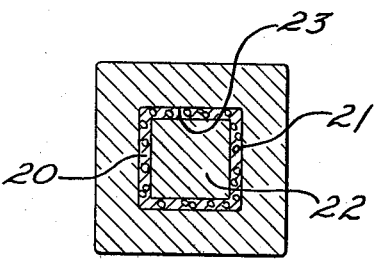
Fig. 4
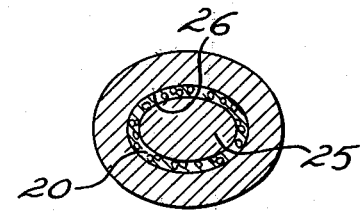
Fig. 5
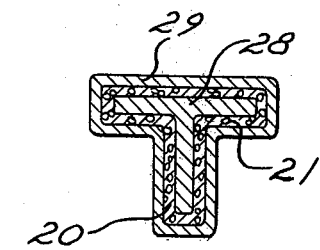
Fig. 6

SHANK AND SOCKET JOINT AND METHOD OF MAKING SAME

This invention relates to a shank and socket type joint and to a method and means for making the same.

The type of joint referred to, wherein a member has an elongated shank mounted within a socket, is widely used for such purposes as securing golf shafts to golf club heads, handles to hand tools, legs to furniture, and many others. Such construction commonly includes a drive fit between the shank and socket supplemented by an adhesive bonding compound. In use of a modern compound such as an epoxy, the adhesive itself can be relied upon for the major holding strength, the drive fit serving to center the shaft with respect to the socket and close the end of the socket thereby effectively retaining the adhesive within the socket until the same is cured.

To effect the desired drive fit and consequent centering of the shank within a socket, particularly when centering a steel shank within the socket of a steel member, it is a practical necessity that the two members be provided with a tapered fit; that is, either the shank or the socket, or both, must be tapered. Otherwise, tolerances of impractical closeness must be held between the shank and socket diameters. In addition to providing the taper or tapers, power means must be provided for exerting the force necessary to drive the shank into the socket. All of the above results in added cost and added time consumed in the manufacture of the shank and socket type joint.

The present invention is directed to a shank and socket type joint wherein a shank is centered in a mating socket cavity, the cavity being substantially larger than the shank whereby a clearance is provided between the mating parts. Thus, the shank wall portions can be straight and parallel with each other and parallel with the wall portions of the socket if desired. A thixotropic adhesive material filled with a solid material in particle form is disposed in the clearance, the particles being of such size that when disposed at spaced random intervals around the shank they hold the shank in proper centered alignment with the socket. Because the thixotropic adhesive will not run out of the joint, the parts are held in place until the adhesive is cured.

The general object of this invention is to provide a new and improved shank and socket joint of the type referred to.

Another object of the invention is to provide a shank and socket joint wherein the need for a tight or drive fit between the parts is obviated.

Yet another object of the invention is to provide a shank and socket joint wherein the shank is initially loosely disposed within the socket while being effectively centered with respect to the socket cavity.

Still another object of the invention is to provide a shank and socket joint wherein a loosely fitting shank is centered within a socket cavity by means suspended within adhesive bonding material.

A further object of this invention is to provide a shank and socket type joint wherein the shank wall portions can all be parallel with each other in the axial direction and parallel with all of the wall portions of the socket.

A still further object of this invention is to provide a shank and socket joint as hereinabove characterized which is readily adaptable for use with shanks and mating sockets of any suitable cross section.

Other objects of the invention and the invention itself will be apparent from the following description thereof and the accompanying drawings, in which said drawings:

FIG. 1 is a side view of a golf club embodying the shaft and socket joint of this invention;

FIG. 2 is an enlarged section taken along the line 2—2 of FIG. 1;

FIG. 3 is a transverse section taken along the line 3—3 of FIG. 2;

FIG. 4 is a transverse section similar to FIG. 3 showing a different cross-sectional shape;

FIG. 5 is a transverse section similar to FIG. 3 showing a still different cross-sectional shape; and FIG. 6 is a transverse section similar to FIG. 3 showing yet another cross-sectional shape.

Referring now to the drawings in all of which like parts are designated by like reference numerals, the first embodiment of the present invention is shown applied to a golf club 10 of conventional form comprising an upper handgrip 11, a downwardly projecting shaft 12 having a lowermost circular shank 13, and a golf club head 14 in the form of an iron secured to the lowermost end portion of said shank.

As shown particularly in FIGS. 2 and 3, the golf club head 14 is preferably made of steel and has an integral, upwardly projecting hosel 16 provided with an upwardly opening, circular socket cavity 17, the lowermost end portion of the shank 13 being centrally disposed within said socket cavity. A decorative ferrule 18, shown in full line in FIG. 1 and in broken lines in FIG. 2, is provided above the upper end of the hosel 16 if desired.

As herein disclosed, the shank 13 is what may be referred to as a parallel tip; that is, it is of uniform cross section whereby all of the wall portions thereof are straight and parallel in the axial direction. The wall portions of the socket 17 are also disclosed as being straight and parallel in the axial direction although the socket cavity is substantially larger in diameter than the outer diameter of said shank 13. Thus the fit between the shank 13 and the socket 17 is loose rather than being a tight or drive fit as in conventional shank and socket joint constructions. The space or clearance between the outer diameter of the shank 13 and the diameter of the socket 17 is filled with a thixotropic adhesive material 20 which, before being cured, has the characteristic of holding solid, heavy, discrete particles in suspension when allowed to stand. Such adhesive may comprise an epoxy resin mixed with a suitable thixotropic suspension agent in a well-known manner.

To effect centering of the shank 13 within the socket 17, the adhesive material 20 is filled with a solid material in pellet form such as a suitable screen size shot, sand, or similar particles 21. The particles or pellets 21 are thoroughly mixed into the adhesive and are of such size that when disposed at random spaced intervals around and along the shank 13 within the clearance between said shank and the socket 17, said shank is held in proper coaxial alignment with the socket cavity. The remainder of the clearance is filled with the thixotropic adhesive which by its nature suspends and holds the small particles 21 in their random spaced positions when said adhesive is at rest whereby the shaft and hosel are held in place until said adhesive is cured.

Thus, with the present invention a perfectly cylindrical shank can be readily centered and mounted within a perfectly cylindrical socket, these two forms being generally the easiest to manufacture or bore, without regard to the extremely close tolerances needed to ensure concentricity or to effect a drive fit. The adhesive secures the shank within the socket, and the particles serve the purpose of centering the shaft within the socket until the cure is effected.

FIGS. 4, 5, and 6 illustrate the manner in which the principle of the present invention may be applied to shank portions, or their equivalent, and socket portions, or their equivalent, of various cross sectional shapes. FIG. 4 illustrates the mounting of a shank 22 of square or rectangular cross section in a mating cavity or socket 23 of like cross-sectional configuration but of substantially larger size. Similarly, FIG. 5 illustrates an oval shaped shank 25 centered and secured within an oversized, oval shaped socket 26. FIG. 6 shows a possible application of the present invention to T-shaped frame members wherein the shank, for example, comprises a T-shaped extrusion 28 disposed centrally within an oversized T-shaped tube 29 and secured therein by the particle filled adhesive 20.

From the foregoing it will be seen that the present invention provides effective means for centering a shank or shanklike member in a mating socket of oversize dimension whereby the shank will be held in its centered position and the adhesive will remain stationary during the cure. It will further be noted that with the present invention the need of the provision of tapers, close tolerances, and a drive fit connection in joints of this type may be eliminated.

It will be understood that many changes in the details of the invention as herein described and illustrated may be made without, however, departing from the spirit thereof or the scope of the appended claims.

What is claimed is:

1. A shank and socket joint for joining a loosely fitting shank of one member to means affording a mating socket cavity of another member; said mating socket cavity being of substantially larger cross-sectional dimension than said shank and providing a substantially uniform clearance around said shank; a hardenable thixotropic adhesive material disposed at rest said clearance; small, solid, relatively heavy discrete particles disposed throughout said adhesive material at random spaced intervals in said clearance for maintaining uniform spacing of said shank with respect to said socket cavity and centering said shank within said socket cavity, said thixotropic adhesive material in said initially flowable form having the characteristic of increasing its viscosty when at rest so as to maintain said particles at said spaced intervals and center said shank until said adhesive material hardens.

2. A shank and socket joint as set forth in claim 1: said discrete particles comprising small metal pellets of a size which is insertable within said clearance and maintains said clearance uniform around said shank.

3. A shank and socket joint as set forth in claim 1: said discrete particles comprising sand of a size which is insertable within said clearance and maintains said clearance uniform around said shank.

4. A shank and socket joint as set forth in claim 1: said shank and mating socket cavity being circular in transverse section.

5. A shank and socket joint as set forth in claim 1: said shank and mating socket cavity being noncircular in transverse section.

6. A shank and socket joint as set forth in claim 1: said shank having wall portions parallel with each other and parallel with all of the wall portions of said socket cavity.

* * * * *